(12) United States Patent
Arceta et al.

(10) Patent No.: US 9,999,297 B1
(45) Date of Patent: Jun. 19, 2018

(54) INPUT AND/OR DISPLAY CONSOLES FOR EXERCISE APPARATUSES HAVING AN ADJUSTABLE MEDIA SHELF

(71) Applicant: Brunswick Corporation, Lake Forest, IL (US)

(72) Inventors: Radmond V. Arceta, Libertyville, IL (US); Matthew P. Blum, Chicago, IL (US)

(73) Assignee: Brunswick Corporation, Mettawa, IL (US)

( * ) Notice: Subject to any disclaimer, the term of this patent is extended or adjusted under 35 U.S.C. 154(b) by 0 days. days.

(21) Appl. No.: 15/222,191

(22) Filed: Jul. 28, 2016

(51) Int. Cl.
*A47B 23/06* (2006.01)
*A63B 24/00* (2006.01)

(52) U.S. Cl.
CPC .............. *A47B 23/06* (2013.01); *A63B 24/00* (2013.01)

(58) Field of Classification Search
CPC ... A63B 22/001; A63B 22/0664; A63B 24/00; A63B 71/0622; A47B 23/06; A47B 24/00
USPC ......... 248/447, 447.1, 447.2, 448, 450, 451, 248/453, 458, 462, 441.1
See application file for complete search history.

(56) References Cited

U.S. PATENT DOCUMENTS

| | | | | |
|---|---|---|---|---|
| 5,284,256 A | * | 2/1994 | Correll-Antoun | A47B 63/00 211/198 |
| 5,765,799 A | * | 6/1998 | Weber | A47B 23/044 248/453 |
| 6,851,656 B2 | * | 2/2005 | Bauman | G06F 1/1601 248/442.2 |
| 7,435,202 B2 | | 10/2008 | Daly et al. | |
| 7,476,181 B1 | | 1/2009 | Honda | |
| 7,568,674 B2 | * | 8/2009 | Polster | A47B 23/04 248/441.1 |
| 7,846,070 B2 | | 12/2010 | Oglesby et al. | |
| 9,049,927 B2 | * | 6/2015 | Wadud | A47B 23/06 |
| 2006/0284045 A1 | * | 12/2006 | Conibear | A47B 96/16 248/441.1 |
| 2007/0131836 A1 | * | 6/2007 | Ross | A47B 23/06 248/444.1 |
| 2008/0242511 A1 | | 10/2008 | Munoz et al. | |
| 2011/0267773 A1 | * | 11/2011 | Macfarlane | G06F 1/1632 361/679.55 |
| 2012/0325689 A1 | * | 12/2012 | Wibby | A47B 23/043 206/45.2 |
| 2013/0134282 A1 | * | 5/2013 | Negretti | A47B 23/04 248/450 |
| 2013/0310220 A1 | * | 11/2013 | Pacheco | A63B 71/0622 482/4 |

(Continued)

OTHER PUBLICATIONS

"Extra motivation to keep your members moving", PRECOR, https://www.precor.com/en-us/entertainment-options.
Unpublished U.S. Appl. No. 15/040,013, filed Feb. 10, 2016.

*Primary Examiner* — Muhammad Ijaz
(74) *Attorney, Agent, or Firm* — Andrus Intellectual Property Law, LLP

(57) ABSTRACT

A console is for an exercise apparatus. The console comprises a console body and a media shelf on the console body. The media shelf is manually pivotable with respect to the console body into and between a retracted position in which the media shelf is configured to support a first media article having a first thickness and an extended position in which the media shelf is configured to support a second media article having a respectively different, second thickness.

7 Claims, 7 Drawing Sheets

(56) References Cited

U.S. PATENT DOCUMENTS

2015/0041609 A1* 2/2015 Lee ................. F16M 11/10
 248/447
2016/0252971 A1* 9/2016 Shirata ............. G06F 3/0219
 345/168

* cited by examiner

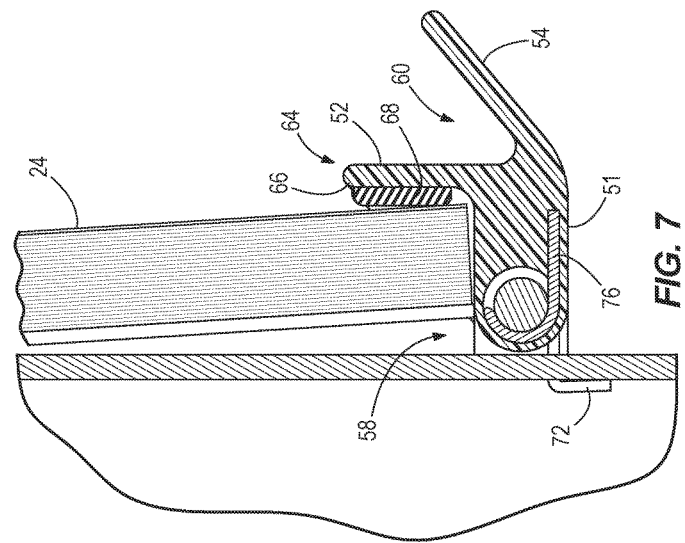
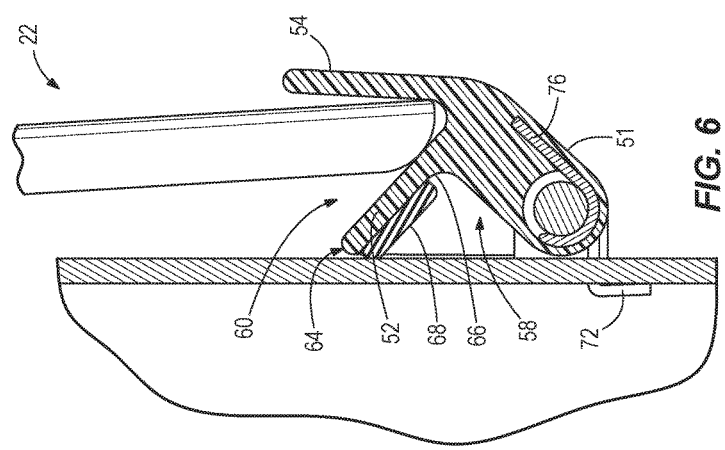

INPUT AND/OR DISPLAY CONSOLES FOR EXERCISE APPARATUSES HAVING AN ADJUSTABLE MEDIA SHELF

FIELD

The present disclosure relates to exercise apparatuses, and particularly to input and/or display consoles for exercise apparatuses.

BACKGROUND

Conventional exercise apparatuses often have one or more input and/or display consoles that provide the user with display options and/or input options for displaying and/or controlling operational characteristics of the apparatus. It is also known in the art to provide a media shelf or rack on the console for supporting a magazine, book or other media article. One example of such a control console for an exercise apparatus is provided in the following U.S. Patent Application, which is hereby incorporated herein by reference in entirety:

U.S. patent application Ser. No. 15/040,013, filed Feb. 10, 2016, discloses a console for an exercise machine. A housing provides a user interface for controlling the exercise machine and a media rack is removably attached to the housing and has a shelf sized to support a media item. At least one touch input element is located on the media rack and is operable by touch to control an auxiliary device on the exercise machine.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain non-limiting examples, a console is configured for use with an exercise apparatus. The console comprises a console body and a media shelf on the console body. The media shelf is manually pivotable with respect to the console body into and between a retracted position in which the media shelf supports a first media article having a first thickness and an extended position in which the media shelf supports a second media article having a respectively different, second thickness.

BRIEF DESCRIPTION OF THE DRAWINGS

Examples of input and/or display consoles for use with exercise apparatuses are described with reference to the following drawing Figures. The same numbers are used throughout the drawing Figures to reference like features and components.

FIG. 6 is a view of Section 6-6 of FIG. 5, illustrating the media shelf in a retracted position.

FIG. 7 is a view of Section 7-7 of FIG. 5, illustrating the media shelf in a fully extended position.

DETAILED DESCRIPTION OF THE DRAWINGS

Figure 1:
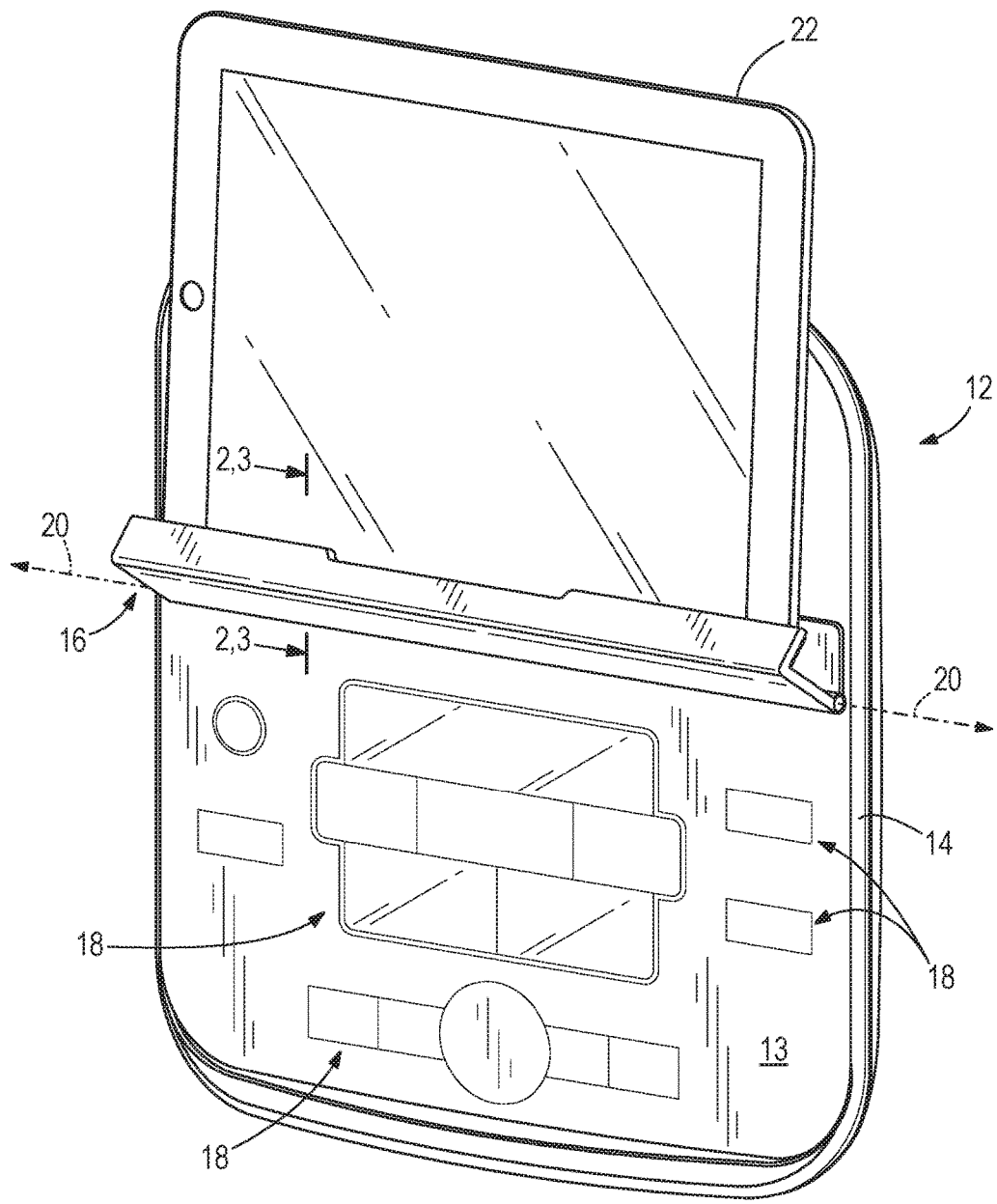
FIG. 1 is a perspective view of a first example of a console for an exercise apparatus, the console having a media shelf.
Figure 3:
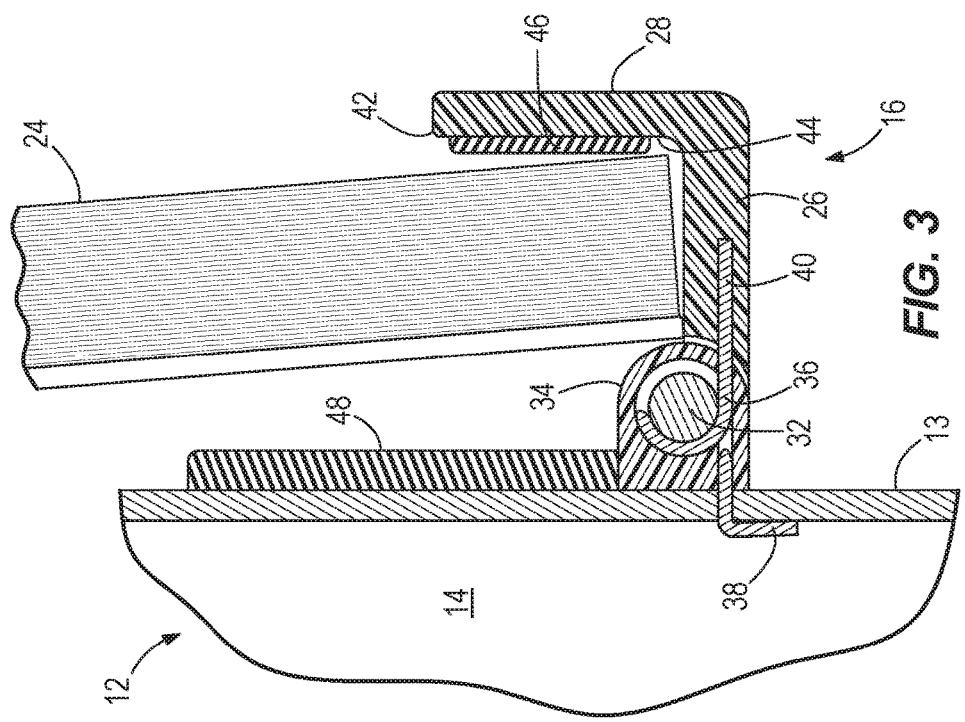
FIG. 3 is a view of section 3-3 of FIG. 1, illustrating the media shelf in a fully extended position.
Figure 2:
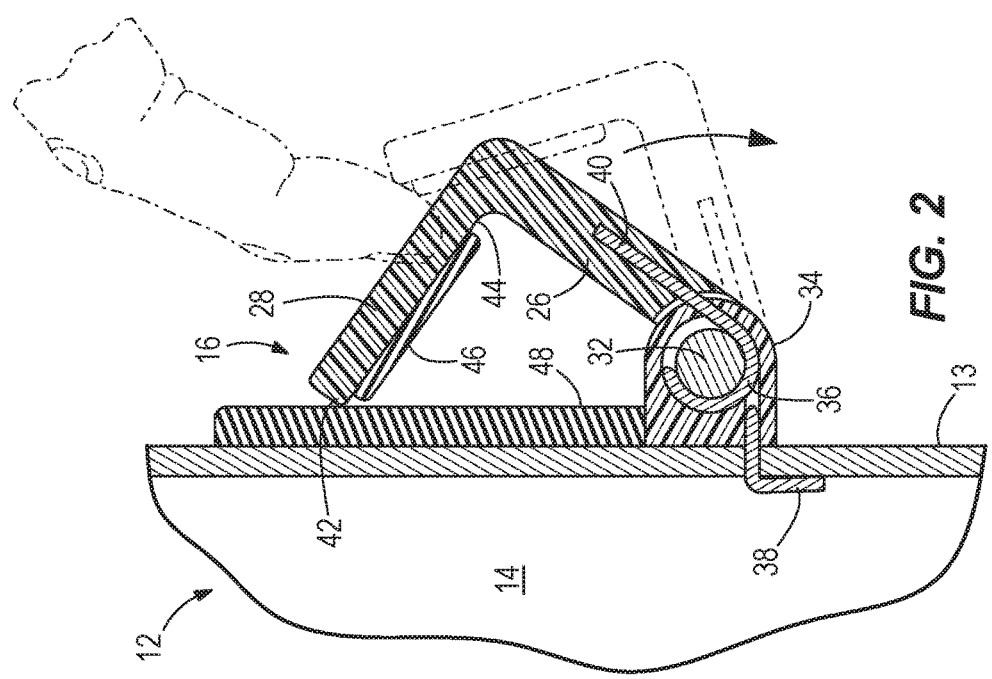
FIG. 2 is a view of section 2-2 of FIG. 1, illustrating the media shelf in a retracted position.
Figure 4:
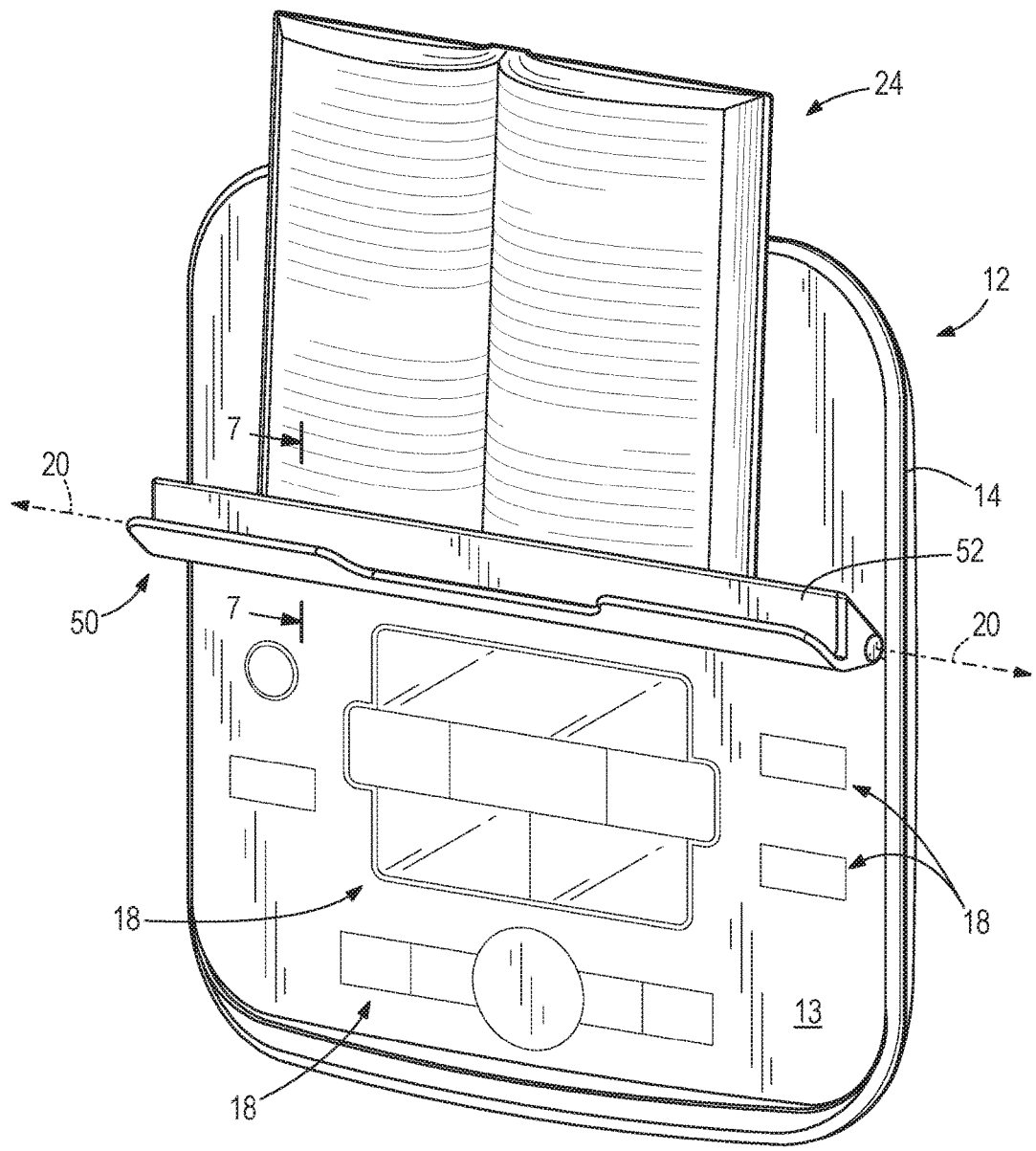
FIG. 4 is a perspective view of a second example of a console for an exercise apparatus, the console having a media shelf.

FIGS. 1-3 depict a first example of a console 12 for an exercise apparatus. The console 12 has a console body 14 and a media shelf 16. The type and configuration of the console 12 is exemplary and can vary from what is illustrated. In the illustrated example, the console 12 provides both a user input interface for controlling operational characteristics of the exercise apparatus and a display for displaying operational characteristics of the exercise apparatus and/or other types of media to the user. A plurality of user input devices and/or display devices, generally referred to by reference character 18 and illustrated in relatively thin solid line format, are provided on the front surface 13 of the console 12. User interaction with the devices 18 allows for control of various functionalities of the exercise apparatus and/or control of the noted display(s). In the illustrated example, the media shelf 16 is located vertically above the input devices 18 and on the noted front surface 13; however in other examples, the media shelf 16 is located on other portions of the console body 14 and/or in other orientations with respect to the noted devices 18.

Comparing FIGS. 1-3, the media shelf 16 is manually pivotable into and between a plurality of positions, including a fully retracted position (see FIG. 2), a fully extended position (see FIG. 3) and a partially retracted position (see FIG. 1), which is located anywhere between the fully retracted position and the fully extended position. Referring to FIG. 1, in the partially retracted position, the media shelf 16 is configured to safely support a first media article 22 having a certain thickness. In the illustrated example, the first media article 22 is a computer tablet having a relatively thin thickness; however this is only one example and the type and configuration of the first media article 22 can vary from what is shown. Referring to FIG. 3, in the fully extended position, the media shelf 16 is configured to support a second media article 24 having a respectively different thickness. In the illustrated example, the second media article 24 is a book having a relatively thick thickness; however this is exemplary and the type and configuration of the second media article 24 can vary from what is shown. In the illustrated example, the thickness of the second media article 24 (the book) is greater than the thickness of the first media article 22 (the tablet). However, advantageously the media shelf 16 is configured for use with other media articles having different thicknesses. It will thus be understood by one having ordinary skill in the art that the media shelf 16 is configured to safely support media articles having different respective thicknesses, including relatively thin thicknesses and relatively thick thicknesses.

Referring to FIGS. 2 and 3, the media shelf 16 has a base wall portion 26 and a front wall portion 28 that extends transversely to the base wall portion 26. In the illustrated example, the base wall portion 26 and the front wall portion 28 together have an L-shaped cross-section; however in other examples, the base wall portion 26 and front wall portion 28 together comprise a curvilinear, J-shaped cross-section, or any other similar cross-section. That is, the cross-section of the illustrated example is not limiting and other configurations can be employed. As illustrated in FIGS. 1 and 3, the base wall portion 26 is configured to support the weight of the first and second media articles 22, 24 with respect to the console body 14 when the media shelf 16 is pivoted away from the fully retracted position. The front wall portion 28 is configured to safely retain the first and second media articles 22, 24 against or with respect to the console body 14, as illustrated in FIGS. 1 and 3.

Referring to FIGS. 2 and 3, a retainer 34 is fixed to the console body 14 and supports a pivot shaft 32 that extends along a pivot axis 20 (see FIG. 1). The base wall portion 26 is pivotably coupled to the console body 14 via the retainer 34 and the pivot shaft 32. One or more spring(s) 36 have a first end 38 fixed to the retainer 34 and/or the console body 14, and a second end 40 fixed to the base wall portion 26 of the media shelf 16. The spring(s) 36 are configured to bias the media shelf 16 out of the fully extended position FIG. 3, i.e. towards the partially retracted position illustrated in FIG. 1 and towards the fully retracted position illustrated in FIG. 2. In the illustrated example, the spring 36 is a torsion spring; however other conventional spring configurations could instead be employed. FIGS. 2 and 3 show one spring; however, more than one spring can be employed, as will become apparent from the example described herein below with reference to FIGS. 4-7.

Referring to FIGS. 1-3, the front wall portion 28 has a top end 42 that is configured to pinch the first and second media articles 22, 24 against the console body 14 and thus safely and securely support the first and second media articles 22-24 with respect to the console 12. More particularly, the spring 36 biases the media shelf 16 towards the partially retracted position illustrated in FIG. 1, thereby pinching the respective first and second medial articles 22, 24 against the console body 14.

When it is desired to place a relatively thin media article (e.g. the first media article 22) onto the media shelf 16, the user simply places the thin media article onto the media shelf 16 so that its weight is supported by the base wall portion 26. The front wall portion 28 retains the thin media article with respect to the front surface 13 of the console body 14, as shown in FIG. 1. When it is desired to place a relatively thick media article (e.g. the second media article 24) onto the media shelf 16, the user manually pivots the media shelf 16 into the fully extended position shown in FIG. 3 and then places the thick media article onto the media shelf 16 so that its weight is supported by the base wall portion 26. Thereafter, the user releases the media shelf 16 and the spring(s) 36 bias the media shelf 16 towards the retracted position shown in FIG. 1 until the top end 42 of the media shelf 16 pinches the relatively thick media article against the console body 14, thus safely and securely retaining the thick media article in place.

Referring to FIGS. 2 and 3, the front wall portion 28 has an inner surface 44 that faces the console body 14. A resilient pad 46 is disposed on the inner surface 44 for engaging with the first and second media articles 22, 24 when the media shelf 16 is biased towards the partially retracted position (FIG. 1) by the spring(s) 36. Another resilient pad 48 is disposed on the console body 14 and faces the inner surface 44. Thus, the first and second media articles 22, 24 and the console body 14 are protected from scratching or other types of damage. The resilient pads 46, 48 can be made of soft rubber or any other similar resilient material that deflects from an original shape under pressure from the respective media article and then naturally springs back to the original shape when the media article is removed.

Referring now to FIGS. 4-7, another example of a media shelf 50 is illustrated. Similar to the example illustrated in FIGS. 1-3, the media shelf 50 is pivotable with respect to the console body 14 about a pivot axis 20. The media shelf 50 is pivotable into and between a retracted position illustrated in FIG. 6, wherein the media shelf 50 is configured to safely support a first media article 22, an extended position illustrated in FIG. 7, wherein the media shelf 50 is configured to receive and safely support the second media article 24 having the greater thickness, and a partially retracted position illustrated in FIG. 4, wherein the media shelf 50 is configured to pinch or retain support the second media article 24 against the front surface 13 of the console body 14.

Figure 5:
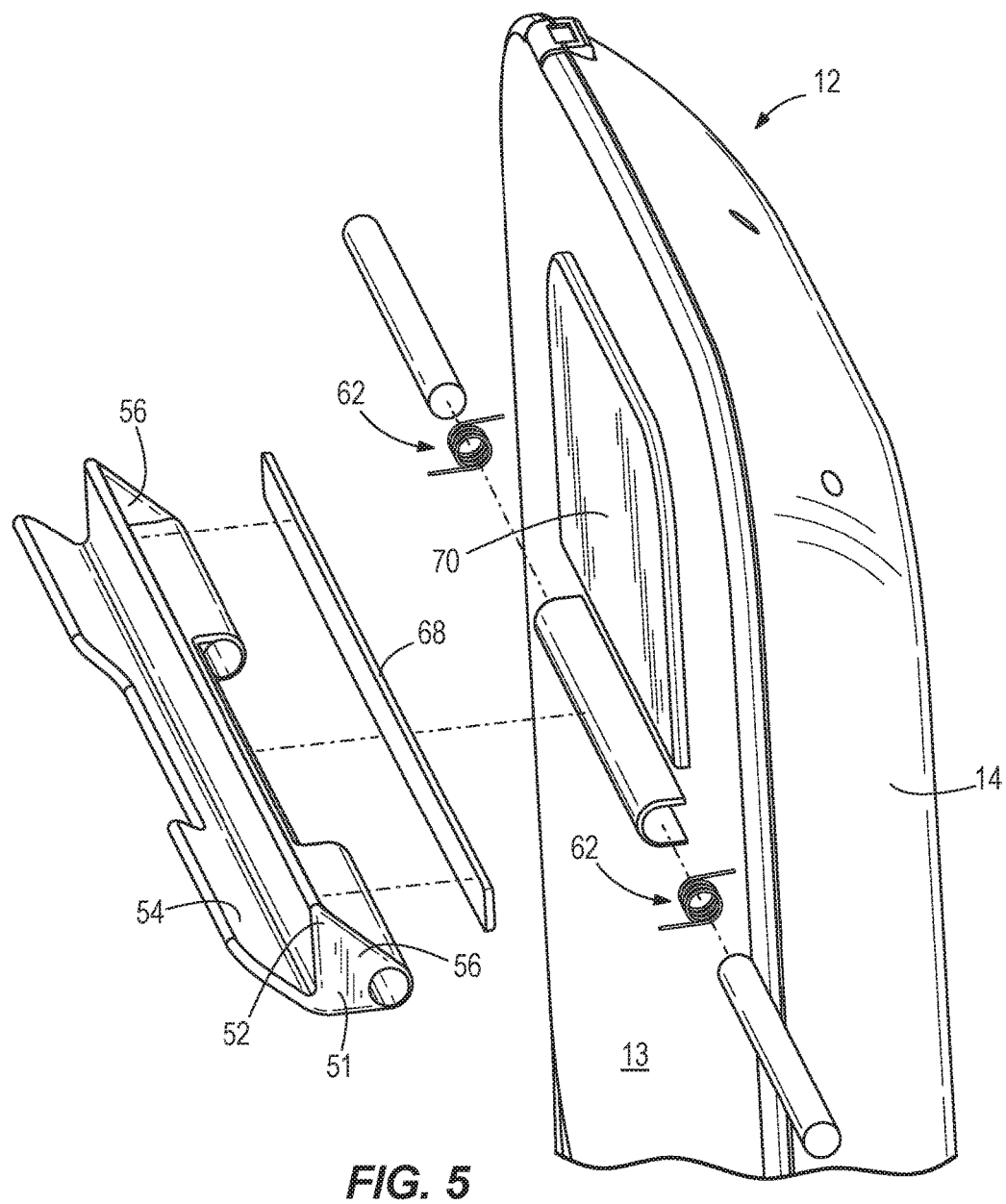
FIG. 5 is an exploded view of the media shelf illustrated in FIG. 4.

Referring to FIGS. 6 and 7, the media shelf 50 has a base wall portion 51 for supporting the weight of the first and second media articles 22, 24, an inner front wall portion 52 for retaining the noted second media article 24 with respect to the console body 14 and an outer front wall portion 54 for retaining the noted first media article 22 with respect to the console body 14, and, as shown, with respect to the inner front wall portion 52. As illustrated in FIGS. 5-7, the media shelf 50 further includes opposing end walls 56 which, together with the inner front wall portion 52 and the console body 14, define an inner recess 58 for receiving and retaining the second media article 24. As illustrated in FIGS. 6 and 7, the inner front wall portion 52 and outer front wall portion 54 extend transversely to each other at an acute angle and form an outer recess 60 for supporting the first media article 22. The shape and configuration of the base wall portion 51, inner front wall portion 52 and outer front wall portion 54 can vary from what is illustrated. In the illustrated example, the media shelf 50 is configured such that the inner recess 58 has a rectangular-shaped cross section when the media shelf 50 is in the fully extended position, and the outer recess 60 has a V-shaped or inverted A-shaped cross-section. However the particular cross-sections are exemplary and can vary from that which is illustrated.

Similar to the example illustrated in FIGS. 1-3, the media shelf 50 is biased into the retracted position illustrated in FIG. 6 by one or more spring(s) 62, which in the illustrated example are torsion springs. Referring to FIGS. 6 and 7, the springs 62 each have a first end 72 fixed to a retainer 74 and the console body 14 and a second end 76 fixed to the media shelf 50. Referring to FIG. 6, in the retracted position, the springs 62 bias the inner front wall portion 52 towards and against the console body 14 such that the outer front wall portion 54 is positioned with the outer recess 60 oriented upwardly, to receive and safely retain the first media article 22 with respect to the console body 14. Referring to FIG. 7, in the extended position, the inner front wall portion 52 is pivoted away from the console body 14 about the pivot axis 20, against the bias of the springs 62, into a position to receive and retain the second media article 24 with respect to the console body 14. In the fully extended position, the inner recess 58 is oriented upwardly and the springs 62 tend to bias the outer front wall portion 54 back towards the fully retracted position, and against the second media article 24, to thereby pinch the second media article 24 between the media shelf 50 and the console body 14 in the partially retracted position. The inner front wall portion 52 has a top end 64 that is configured to pinch the second media article 24 against the console body 14 when the media shelf 16 is biased by the springs 62 towards the fully retracted position and against the second media article 24.

When it is desired to place a relatively thin media article (e.g. the first media article 22) onto the media shelf 50, the user places the thin media article onto the media shelf 50, into the outer recess 60 so that its weight is supported by the base wall portion 51. The outer front wall portion 54 retains the media article with respect to the front surface 13 of the console body 14, as shown in FIG. 6. When it is desired to place a relatively thick media article (e.g. the second media article 24) onto the media shelf 50, the user manually pivots the media shelf 50 into the fully extended position shown in FIG. 7 and then places the thick media article onto the media shelf 50 so that its weight is supported by the base wall portion 51. Thereafter, the user manually releases the media shelf 50 and the spring(s) 62 bias the media shelf 50 towards the retracted position shown in FIG. 4, until the top end 64 of the inner front wall portion 52 pinches the relatively thick media article against the console body 14, thus safely and securely retaining the media article in place.

The inner front wall portion 52 has an inner surface 66 that faces the console body 14. A resilient pad 68 is disposed on the inner surface 66 for engaging with the second media article 24 when the media shelf 50 is biased towards the retracted position and against the second media article 24 by the springs 62. A resilient pad 70 is disposed on the console body 14 and is oriented towards the inner surface 66. The resilient pad 70 is configured to engage with the second media article 24. Thus the resilient pads 68, 70 protect the console body 14 and second media article 24 from scratching or other damage. Similar to the example described herein above with respect to FIGS. 1-3, the resilient pads 68, 70 can be made of soft rubber or any other similar resilient material that deflects from an original shape under pressure from the respective media article and then naturally springs back to the original shape when the media article is removed.

Figure 8:
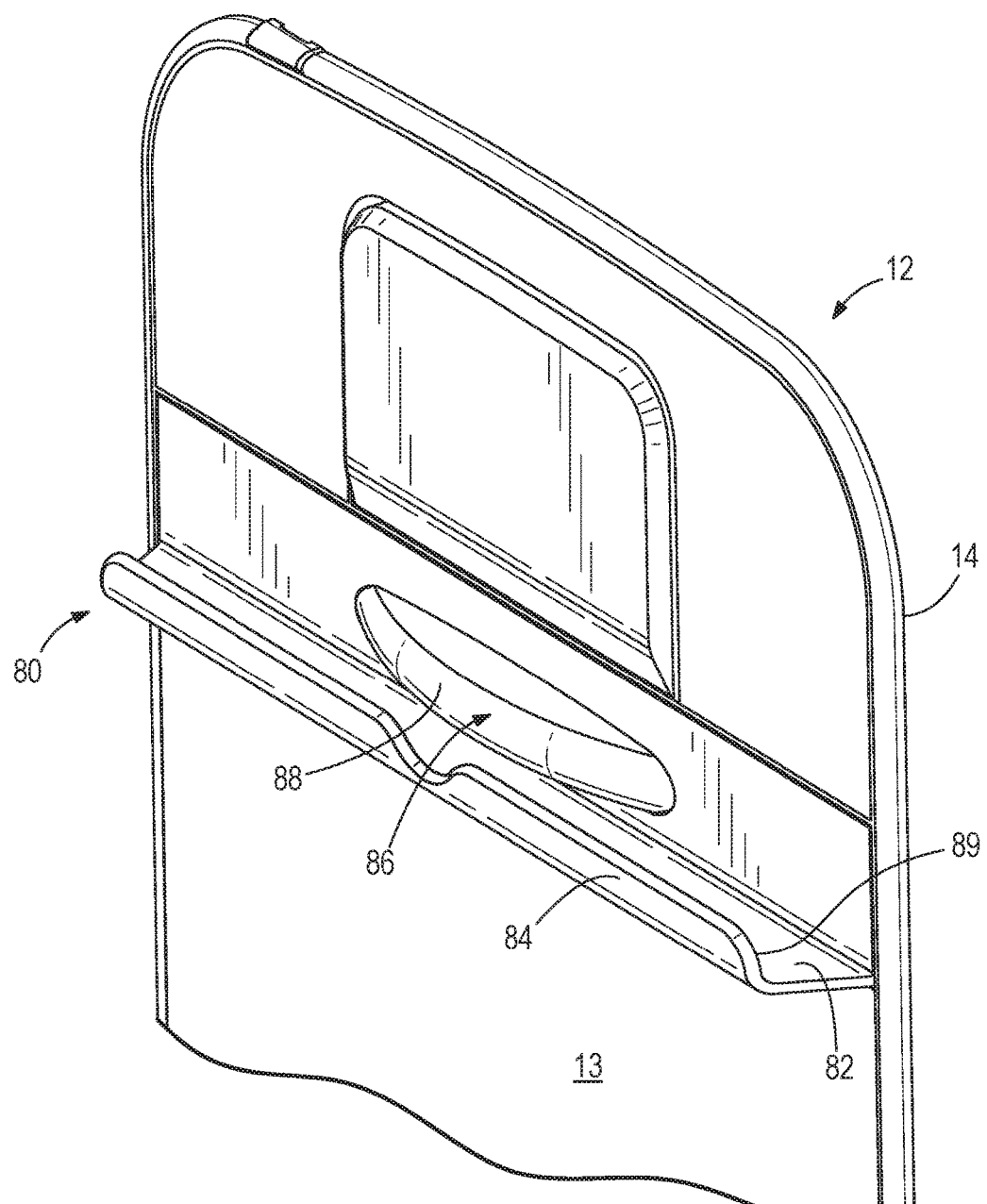
FIG. 8 is a perspective view of a third example of a console for an exercise apparatus.

Referring now to FIG. 8, another example of a console 12 having a media shelf 80 is illustrated. Similar to the example illustrated in FIGS. 1-3, the media shelf 80 has a base wall portion 82 for supporting the weight of a respective media article and a front wall portion 84 that extends transversely with respect to the base wall portion 82 for securing the media article with respect to the console 12. A resilient member 86, which in this example is a crush bulb having a curved outer surface 88, extends from the console body 14 towards the inner surface 89 of the front wall portion 84. The resilient member 86 is made of rubber or other resilient material that deflects from an original shape under pressure from the respective media article and then naturally springs back to the original shape when the media article is removed. Thus, the resilient member 86 is configured to expand and contract under pressure to thereby bias the media article against the inner surface 89, to safely and securely retain media articles having different respective thicknesses with respect to the console 12. The configuration of the resilient member 86 can vary from that which is illustrated, and can for example extend from the inner surface 89 towards the front surface 13 of the console body 14 (i.e. oppositely of what is illustrated). The number, size, and orientation of resilient member(s) 86 can also vary from that which is illustrated. For example, several resilient members 86 can be disposed along the length of the media shelf 80.

Figure 10:
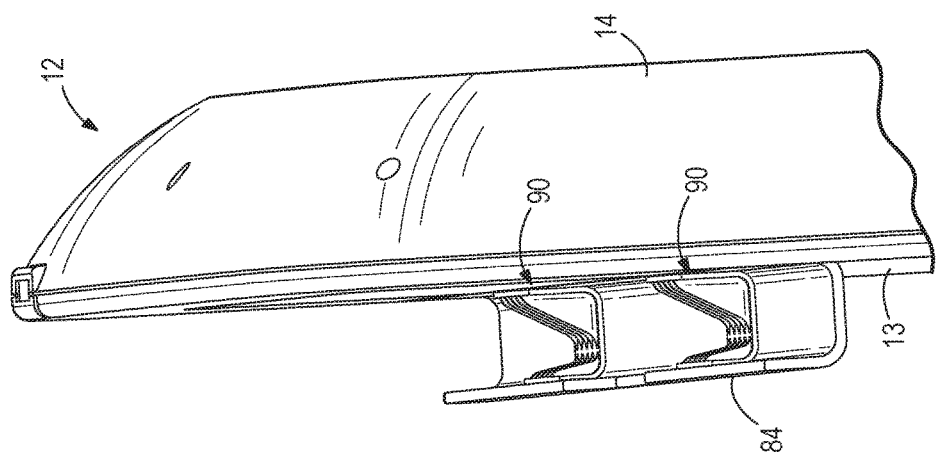
FIG. 10 is a side view of the fourth example illustrated in FIG. 9.
Figure 9:
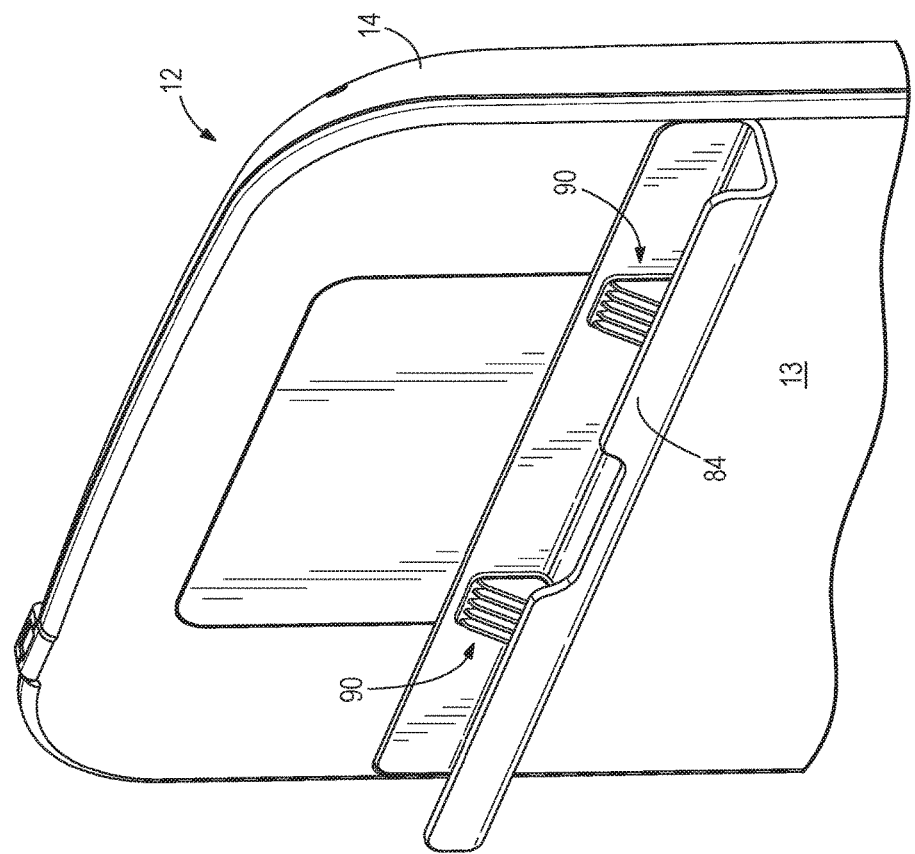
FIG. 9 is a perspective view of a fourth example of a console for an exercise apparatus.

FIGS. 9 and 10 depict an example that is similar to FIG. 8, except this example includes resilient members 90 in the form of crush ribs. The resilient members 90 are designed to crush or collapse upon insertion of a media article between the front wall portion 84 and front surface 13 of the console body 14. The resilient members 90 are formed of rubber or other similar material that deflects from an original shape under pressure from the respective media article and then naturally springs back to the original shape when the media article is removed, thus safely supporting and retaining media articles having different respective thicknesses.

In the present Description, certain terms have been used for brevity, clearness and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A console for an exercise apparatus, the console comprising:
    a console body and a media shelf on the console body, wherein the media shelf is manually pivotable with respect to the console body into and between a retracted position in which the media shelf is configured to support a first media article having a first thickness and an extended position in which the media shelf is configured to support a second media article having a respectively different, second thickness;
    a spring that biases the media shelf towards the retracted positions;
    wherein the second thickness is greater than the first thickness;
    wherein the media shelf comprises an inner front wall portion for retaining the second media article with respect to the console body and an outer front wall portion for retaining the first media article with respect to the console body;
    wherein the inner front wall portion and outer front wall portion are transverse to each other;
    wherein in the retracted position, the spring biases the inner front wall portion against the console body such that the outer front wall portion is positioned to retain the first media article with respect to the console body;
    wherein in the extended position, the inner front wall portion is pivoted away from the console body into a position to receive and retain the second media article with respect to the console body;
    wherein in the extended position, the spring biases the outer front wall portion towards the retracted position and against the second media article to thereby pinch the second media article between the media shelf and the console body; and
    wherein the inner front wall portion comprises a top end that is configured to pinch the second media article against the console body when the media shelf is biased by the spring towards the retracted position and against the second media article.

2. The console according to claim 1, wherein the spring comprises a torsion spring.

3. The console according to claim 1, wherein the media shelf further comprises opposing end walls which, together with the inner front wall portion and the console body, form a recess for retaining the second media article.

4. The console according to claim 1, wherein the inner front wall portion comprises an inner surface that faces the console body, and further comprising a resilient pad disposed on the inner surface for engaging with the second media article when the media shelf is biased by the spring towards the retracted position and against the second media article.

5. The console according to claim 1, further comprising a resilient pad disposed on the console body for engaging with the first and second media articles.

6. A console for an exercise apparatus, the console comprising:
- a console body and a media shelf on the console body, wherein the media shelf is pivotable with respect to the console body into and between a retracted position in which the media shelf is configured to support a first media article having a first thickness and an extended position in which the media shelf is configured to supporting a second media article having a different, second thickness;
- wherein the media shelf comprises an inner front wall portion for retaining the second media article with respect to the console body and an outer front wall portion for retaining the first media article with respect to the console body;
- wherein in the retracted position, a spring biases the inner front wall portion against the console body such that the outer front wall portion is positioned to retain the first media article with respect to the console body;
- wherein in the extended position, the inner front wall portion is pivoted away from the console body into a position to retain the second media article with respect to the console body;
- wherein in the extended position, the spring biases the outer front wall portion towards the retracted position and against the second media article to thereby pinch the second media article between the media shelf and the console body; and
- wherein the inner front wall portion and outer front wall portion extend at an acute angle to each other.

7. The console according to claim 6, wherein the inner front wall portion comprises a top end that is configured to pinch the second media articles against the console body when the media shelf is biased towards the retracted position and against the second media article by the spring, and wherein the inner front wall portion comprises an inner surface that faces the console body, and further comprising a resilient pad disposed on the inner surface for engaging with the second media article when the media shelf is biased by the spring towards the retracted position and against the second media article.

* * * * *